(12) United States Patent
Moribe et al.

(10) Patent No.: US 7,848,049 B2
(45) Date of Patent: Dec. 7, 2010

(54) MAGNETIC DISK APPARATUS AND MAGNETIC DISK ACCESS CONTROL METHOD

(75) Inventors: Mineo Moribe, Kawasaki (JP); Masakazu Taguchi, Kawasaki (JP); Atsushi Tanaka, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 33 days.

(21) Appl. No.: 12/484,866

(22) Filed: Jun. 15, 2009

(65) Prior Publication Data

US 2010/0020433 A1    Jan. 28, 2010

(30) Foreign Application Priority Data

Jul. 23, 2008    (JP)    ............... 2008-189535

(51) Int. Cl.
*G11B 21/02*    (2006.01)
*G11B 5/596*    (2006.01)

(52) U.S. Cl. ............... 360/75; 360/77.02; 360/31
(58) Field of Classification Search ............... None
See application file for complete search history.

(56) References Cited

U.S. PATENT DOCUMENTS 7,738,202 B1 *    6/2010    Zheng et al. ............... 360/46

2010/0128384 A1 *    5/2010    Shibano ............... 360/75

FOREIGN PATENT DOCUMENTS

| JP | A 2003-157507 | 5/2003 |
| JP | A 2004-110896 | 4/2004 |
| JP | A 2006-66006  | 3/2006 |
| JP | A 2007-226918 | 9/2007 |

* cited by examiner

*Primary Examiner*—Andrew L Sniezek
(74) *Attorney, Agent, or Firm*—Greer, Burns & Crain, Ltd.

(57) ABSTRACT

A magnetic disk apparatus includes a magnetic disk, a magnetic head, a reverse-pulse detector, and a re-magnetizer. The magnetic disk includes a data recording area and a servo-pattern area. The magnetic regions of the servo-pattern area have been pre-magnetized in the same direction or pre-magnetizing direction. The magnetic head is arranged to reciprocate radially of the magnetic disk. The reverse-pulse detector is provided for reading the servo-pattern area with the magnetic head before data recording or reproducing with respect to the data recording area is performed. The reverse-pulse detector detects, from servo reproduction signal pulses, reverse pulses corresponding to the reversal of magnetization direction relative to the pre-magnetizing direction. The re-magnetizer causes the magnetic head to perform the re-magnetizing of the magnetic regions in the servo-pattern area when the count of reverse pulses is not smaller than a threshold number.

3 Claims, 5 Drawing Sheets

Servo Reproduction Signal      Record Reproduction Signal

MAGNETIC DISK APPARATUS AND MAGNETIC DISK ACCESS CONTROL METHOD

CROSS-REFERENCE TO RELATED APPLICATION

This application is based upon and claims the benefit of priority of the prior Japanese Patent Application No. 2008-189535, filed on Jul. 23, 2008, the entire contents of which are incorporated herein by reference.

FIELD

An embodiment of the present invention relates to a magnetic disk apparatus used for e.g. perpendicular magnetic recording. Another embodiment of the present invention relates to a magnetic disk access control method.

BACKGROUND

Currently, proposals are made for perpendicular magnetic recording as an alternative to horizontal magnetic recording. In horizontal magnetic recording, recording dots have a magnetization direction along the recording plane in the magnetic recording layer. Perpendicular magnetic recording has an advantage over the horizontal magnetic recording in that recording density can be increased easily. In perpendicular magnetic recording, recording dots have a magnetization direction in the thickness direction of the magnetic recording layer. An example of magnetic disk apparatus for perpendicular magnetic recording is described in Japanese Laid-open Patent Publication No. 2003-157507, in which the magnetic disk apparatus includes a bit patterned recording medium. In the bit patterned medium, magnetic regions as recording dots are spaced equidistantly from each other.

A bit patterned medium has a data recording area which is a non-magnetic area scattered with magnetic regions, and a servo-pattern area which is used for disk access control such as magnetic head positioning control and clock signal generation. The servo-pattern area is formed with a large number of belt-like magnetic regions extending substantially radially of the magnetic disk. In the data recording area each magnetic region is given a magnetization direction as a representation of data to be recorded whereas in the servo-pattern area all of the magnetic regions are given the same magnetization direction by a formatting procedure which is performed e.g. during the manufacturing process.

However, the magnetic disk apparatus equipped with the above-described bit patterned medium has a problem in regard to disk access control, that is, the magnetic regions of a large area are susceptible to undesired magnetization reversal due to external disturbances.

Specifically, referring to FIG. 6A, a magnetic region 100 is composed of polycrystalline crystal grains and includes a plurality of magnetic domains 110 through 130, each of which is bordered by a crystal grain boundary and functions as a unit for generation of magnetization directions P1 through P3. The magnetic domains 110 through 130 included in the magnetic region 100 have a strong magnetic exchange coupling force, and the magnetic region 100 is magnetized in one direction.

FIG. 6B illustrates a magnetic region 100' which is greater in area than the region 100 illustrated in FIG. 6A. Due to the greater area, the magnetic region 100' includes a larger number of magnetized magnetic domains (in the illustration, five magnetic domains 110'-150' are depicted). Taking the middle magnetic domain 130' for example, this domain is influenced by the magnetic fields MF generated by the sandwiching magnetic domains 110', 120', 140' and 150'. As readily understood, when the area of the magnetic region 100' is greater, the influence of the magnetic fields MF becomes greater, generating a large demagnetizing field DF acting on the middle magnetic domains 130'. In such a case, where the coercive force of the magnetic domain 130' is seemingly weakened, the magnetization direction P3 may be reversed rather easily by the external magnetic disturbances. This may also hold for the other magnetization directions P1, P2, P4 and P5.

This affects the disk access control servo-pattern area which contains a large number of magnetic regions which have a larger area than magnetic regions in the data recording area. When the disk is new, the magnetic regions have a perfectly uniform magnetization direction, but the magnetization direction is likely to be reversed by external disturbances and other forces in the magnetic regions. Once the reversing of magnetization direction occurs in the servo-pattern area, it becomes no longer possible to make correct magnetic recognition of the magnetic regions in the servo-pattern area, leading to troubles in magnetic head positioning control and clock signal generation, and to inability to perform the disk access control properly.

SUMMARY

The present invention has been proposed under the above-described circumstances, and it is therefore an object of one aspect of the present invention to provide a magnetic disk apparatus capable of making magnetic recognition of the servo-pattern area correctly and performing disk access control properly. Another object is to provide a magnetic disk access control method.

A first aspect of the present invention provides a magnetic disk apparatus includes a magnetic disk, a magnetic head, a reverse-pulse detector, and a re-magnetizer. Specifically, the magnetic disk is provided with a data recording area and a servo-pattern area, where the data recording area is provided by a non-magnetic area scattered with magnetic regions, and the servo-pattern area includes a plurality of magnetic regions each having a larger area than the magnetic regions in the data recording area. The magnetic regions of the servo-pattern area has been pre-magnetized in the same direction. The magnetic head is arranged to reciprocate radially of the magnetic disk for giving a magnetization direction to the magnetic regions in the data recording area and for reading the magnetization direction of the magnetic regions in the data recording area and of the magnetic regions in the servo-pattern area. The reverse-pulse detector, provided for reading the servo-pattern area with the magnetic head before recording or reproducing with respect to the data recording area, is arranged to detect, from servo reproduction signal pulses obtained from magnetic directions in the magnetic regions of the servo-pattern area, a reverse pulse or pulses corresponding to the reversal of magnetization direction relative to the above-mentioned same direction of pre-magnetization. The re-magnetizer causes the magnetic head to perform re-magnetizing of the magnetic regions in the servo-pattern area when the count of reverse pulses is not smaller than a predetermined threshold number.

A second aspect of the present invention provides a magnetic disk access control method for the above magnetic disk apparatus. The method, implemented prior to recording or reading with respect to the data recording area, includes the following steps: Reading the servo-pattern area with the magnetic head for obtaining servo reproduction signal pulses corresponding to magnetic directions in the magnetic regions of the servo-pattern area; Detecting, from the servo reproduction signal pulses, reverse pulses corresponding to a magnetization direction opposite to the uniform magnetization direction; and Re-magnetizing the magnetic regions in the servo-pattern area with the magnetic head when a count of the reverse pulses is not smaller than a threshold number.

According to embodiments of the present invention, the magnetization directions of the respective magnetic regions in the servo pattern area can be the same by the re-magnetizing operation. Accordingly, correct magnetic recognition of the servo-pattern area is expected, and proper disk access control can be performed.

Other features and advantages of the present invention will become clearer from the following detailed description with reference to the attached drawings.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Figure 1:
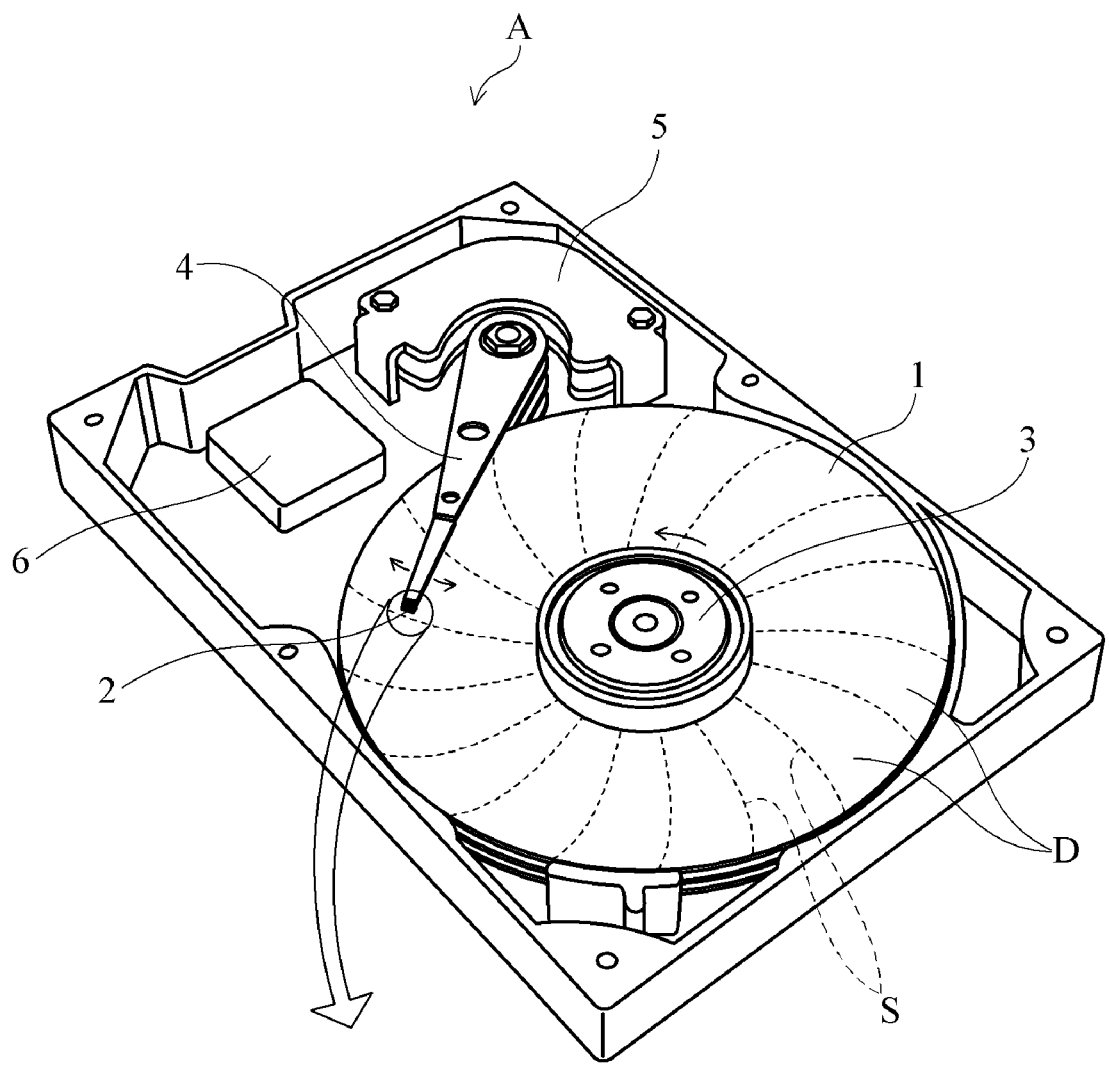
FIG. 1 is a perspective view which illustrates a magnetic disk apparatus according to an embodiment of the present invention.
Figure 1:
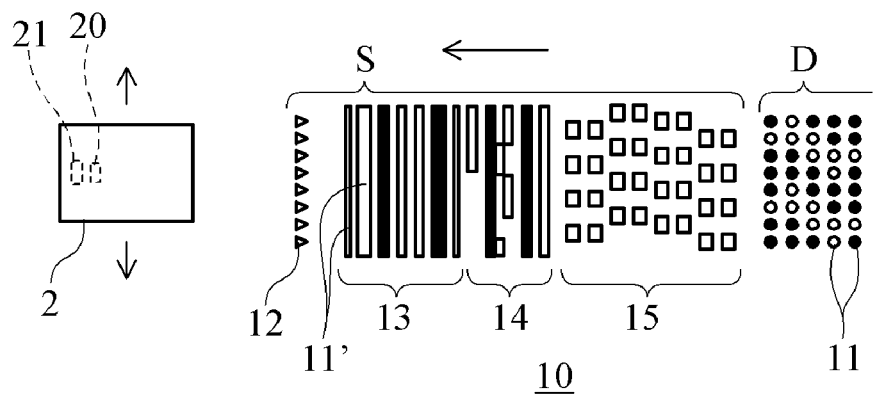

FIGS. 1 through 4 illustrate a magnetic disk apparatus according to an embodiment of the present invention. As illustrated in FIG. 1, a magnetic disk apparatus A includes magnetic disks 1, magnetic heads 2, a spindle motor 3, a swing arm 4, a voice coil motor 5, and a disk controller 6. The magnetic disks 1 are provided by a bit patterned medium and each disk has an upper and a lower surfaces both serving as a recording surface. The disks are arranged vertically, with a predetermined space provided below and above each disk. The magnetic heads 2, which make reading/writing of magnetic information from/to the magnetic disk 1, are faced to respective recording surfaces of the magnetic disk 1 at respective tips of the swing arm 4. Each magnetic head 2 is provided with a reproducing element 20 and a recording element 21 placed next to each other substantially in a circumferential direction of the magnetic disk 1 respectively for reading and writing of magnetic information performed independently from each other (see FIG. 2). The spindle motor 3 rotates the magnetic disk 1 at a high speed. The swing arm 4, which is swung by the voice coil motor 5, moves the magnetic heads 2 in a reciprocating path in a substantially radial direction of the magnetic disk 1. The magnetic heads 2, the spindle motor 3, and the voice coil motor 5 are controlled by the disk controller 6. The disk controller 6 is provided by a microcomputer which includes a CPU, a memory, etc., or by a wired logic circuit which is equivalent in function to the microcomputer.

Figure 3:
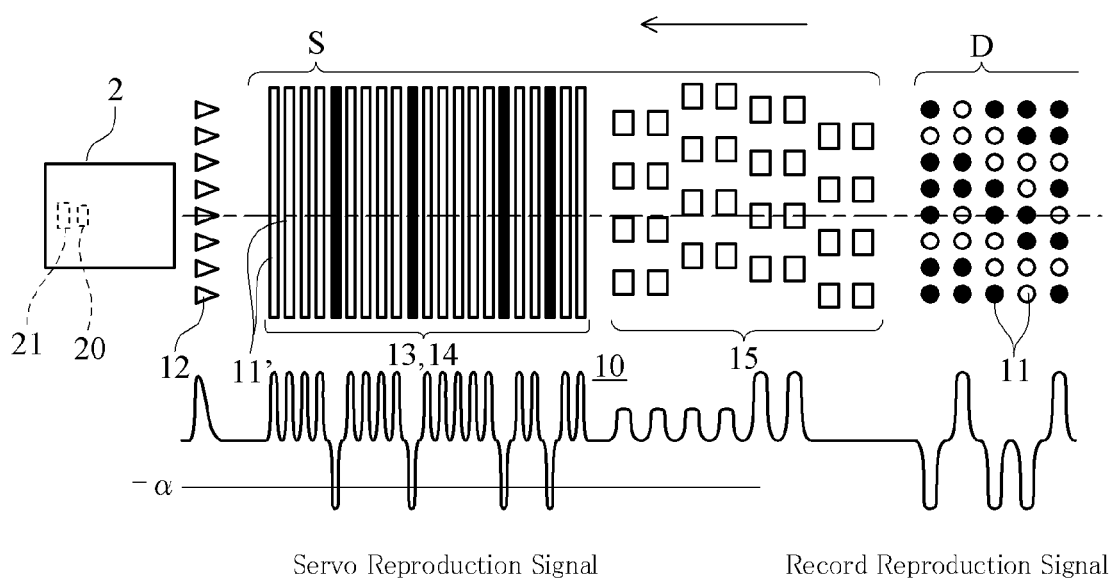
FIG. 3 is a diagram for illustrating a signal processing.

As illustrated in FIG. 1 and FIG. 3, the magnetic disk 1 is provided with a plurality of servo-pattern areas S to divide a data recording area D along the path of the magnetic head 2. The data recording area D, which is an area where recording/reproducing of magnetic information is performed, is a non-magnetic area 10 dotted with magnetic regions 11 arranged equidistantly in a circumferential direction of the magnetic disk 1. Magnetic information is recorded/reproduced in the form of magnetization direction at each of the magnetic regions 11, i.e., whether the magnetization is made in the upward direction or in the downward direction in the thickness of the magnetic disk 1.

As illustrated in FIG. 1, the servo-pattern area S has a reading start mark 12, a preamble section 13, an address section 14, and a burst pattern section 15. The reading start mark 12, provided by triangular magnetic regions for example, or magnetic regions of any other distinguishing shape not to be found anywhere else, is arranged in line substantially radially of the magnetic disk 1 at a head of the servo-pattern area S. The preamble section 13, which is provided for generation of clock signals utilized as a reference when the magnetic head 2 performs recording/reproducing to/from the address section 14, the burst pattern section 15 and the data recording area D, is a non-magnetic area 10 formed with a plurality of long and narrow magnetic regions 11' each having a larger area than the magnetic region 11 in the data recording area D and extending substantially radially of the magnetic disk 1. The address section 14, which provides address information such as a track number and a sector number, is a non-magnetic area 10 including magnetic regions 11' patterned to the address information. The burst pattern section 15 provides a pattern for fine tuning in tracking, and includes rectangular magnetic regions arranged in a predetermined layout pattern. It should be noted here that in the present embodiment, marking is made in magnetic regions 11' of the preamble section 13 and of the address section 14, and these magnetic regions 11' are extended substantially radially of the magnetic disk 1 to have a large area. However, magnetic regions in the burst pattern section may also be extended substantially radially of the magnetic disk to have a large area depending on the tracking method employed.

The servo-pattern area S described as the above is magnetized in the manufacturing process so that the magnetization direction is the same direction in all of the magnetic regions 11'. As described above, the servo-pattern area S includes a large number of magnetic regions 11' which have a larger area than that of the magnetic regions 11 in the data recording area. For this reason, as explained above, magnetic regions 11' in the servo-pattern area S are more susceptible than magnetic regions 11 in the data recording area D to magnetization direction reversal caused by external disturbances. As illustrated in FIG. 1 and FIG. 3, the servo-pattern area S originally has all of its magnetic regions 11' magnetized in the same direction in the manufacturing process as indicated by white magnetic region 11', but eventually will have magnetic regions 11' magnetized in the reverse direction as indicated by black magnetic regions 11' due to external magnetic disturbances. It should be noted here that in FIG. 3, the preamble section 13 and the address section 14 are conveniently illustrated as one consistent pattern.

Figure 2:
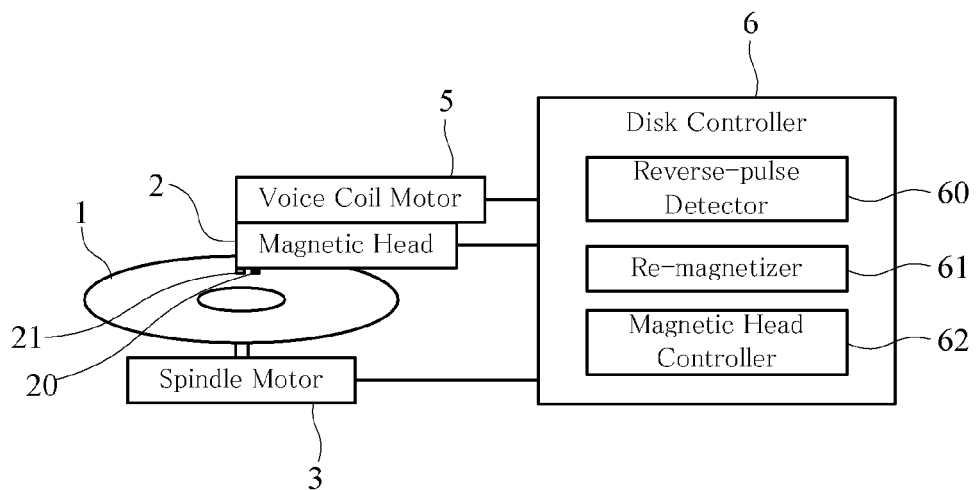
FIG. 2 is a block diagram of the magnetic disk apparatus in FIG. 1.

As illustrated in FIG. 2, the disk controller 6 includes such function modules as a reverse-pulse detector 60, re-magnetizer 61 and a magnetic head controller 62, in addition to other function modules (not illustrated) which control the spindle motor 3 and the voice coil motor 5.

As the magnetic head 2 reads a servo-pattern area S via the reproducing element 20, a servo reproduction signal in the form of a pulse string is obtained in accordance with the magnetization direction of the servo-pattern area S. From this signal, the reverse-pulse detector 60 detects reversed pulses. Each reversed pulse represents a magnetic region 11' where the original magnetization direction has been reversed.

If the number of the reverse pulses is equal or greater than a predetermined threshold number, the re-magnetizer 61 causes the recording element 21 in the magnetic head 2 to re-magnetize the magnetic regions 11' in the servo pattern area S.

The magnetic head controller 62 controls operations of the reproducing element 20 and the recording element 21 in the magnetic head 2. As illustrated in FIG. 3, there is a case where a certain number of magnetic regions 11' in the servo-pattern area have their magnetization direction having been reversed by external magnetic disturbances. When the reproducing element 20 of the magnetic head 2 reads such a servo-pattern area, the reading yields a servo reproduction signal, namely a string of positive and negative pulses, which represents the normal and reversed magnetization directions. In this example, the pulse which has a positive signal level represents a normal magnetic region 11' whereas the pulse whose detected level is negative represents a magnetic region which has a reversed magnetization direction. As a reference, note a case where the reproducing element 20 reads a data recording area D. Since magnetic regions 11 in the data recording area D are less prone to magnetic reversal than magnetic regions in the servo pattern area S, the reading yields a recording/reproducing signal which represents intact magnetization directions as at the time when the magnetic recording was made. If the recording element 21 is controlled at a timing in accordance with this recording/reproducing signal, a pattern of magnetization directions as illustrated in FIG. 3 will be recorded in the magnetic regions 11 in the data recording area D.

Figure 4:
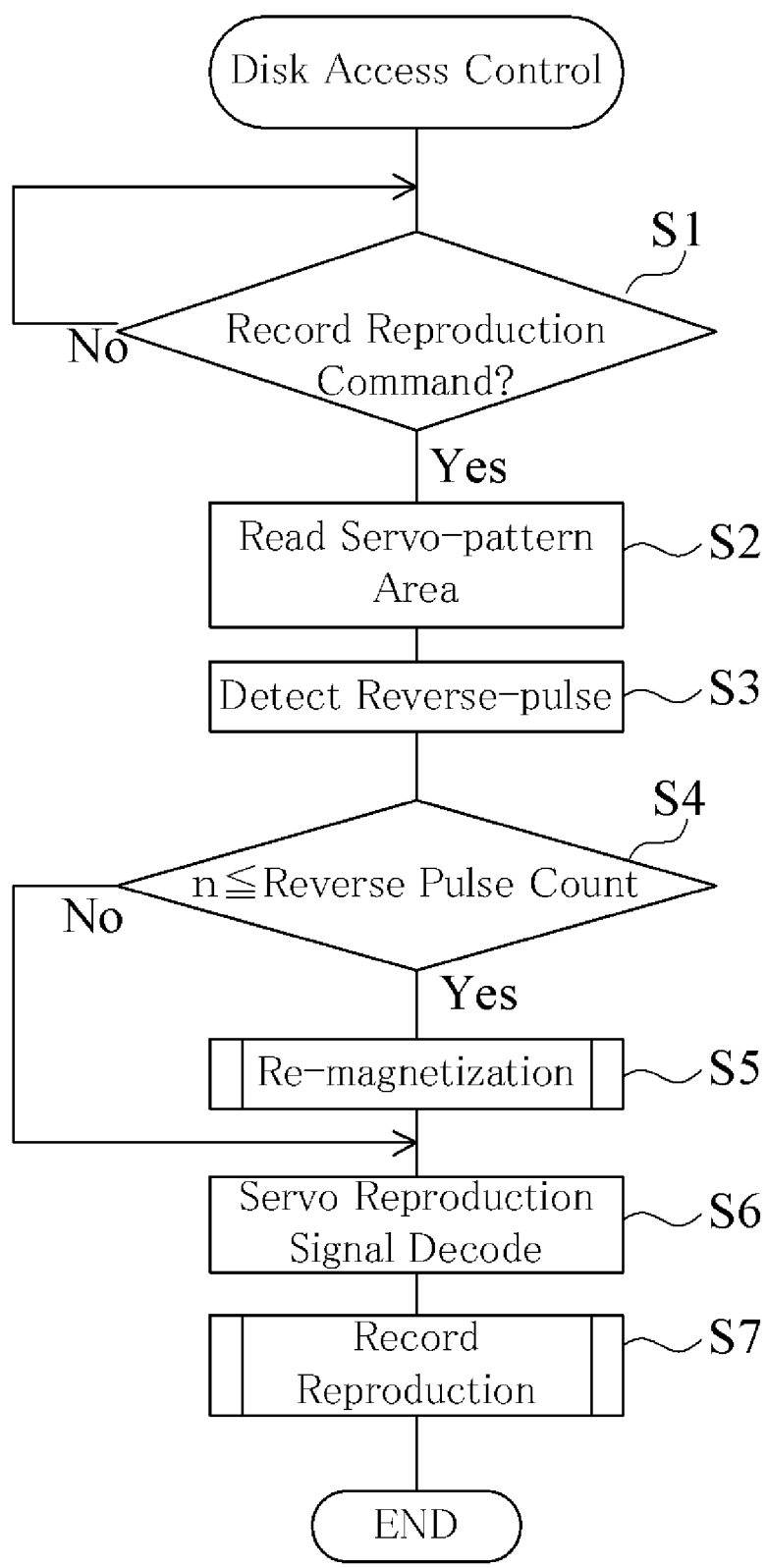
FIG. 4 is a flowchart for a disk access control procedure.

Next, an operation of the magnetic disk apparatus A will be described with reference to FIG. 4, which is a flowchart illustrating a disk access control procedure.

First, when a record reproduction command is issued from e.g. a host computer to the magnetic disk apparatus A (S1: YES), the magnetic head controller 62 reads the servo-pattern area S via the reproducing element 20 of the magnetic head 2 (S2). The reading of the servo-pattern area S is triggered by a detection signal of the reading start mark 12. As a result of the reading operation, a servo reproduction signal as illustrated in FIG. 3 is obtained (S3).

After the servo reproduction signal is obtained, the reverse-pulse detector 60 searches the servo reproduction signal for reverse pulses (S3). The reverse pulses are pulses which have a negative signal level. A reverse pulse is generated correspondingly to a magnetic region 11' whose magnetization direction has been reversed from the original magnetization direction given at the time of manufacture. The reverse pulse can be identified by detection of a signal level which is lower than a predetermined threshold value $-\alpha$.

Next, the number of the reverse pulses detected in the servo reproduction signal is counted, and it is determined if the number is not smaller than a predetermined number n (S4). The number n is the permissible, maximum number of magnetic regions 11' whose magnetization direction has been reversed. Thus, if the count obtained is smaller than the number n, it is still possible to perform the recording/reproducing operation normally by decoding the servo reproduction signal as it is.

If the number of the reverse pulses is equal to or greater than the predetermined number n (S4: YES), the re-magnetizer 61 waits for the servo pattern area S to complete its revolution, and then re-magnetizes the servo pattern area S using the recording element 21 of the magnetic head 2 (S5). In this re-magnetizing operation, the recording element 21 is operated only for a predetermined amount of time from a moment when the reproducing element 20 has detected the reading start mark 12 to a moment when it has passed through the servo pattern area S, so that the magnetic regions 11' passing by the recording element 21 is given a magnetic field of a fixed direction. Many of those magnetic regions 11' which have a reversed magnetization direction are those which have a relatively large area. These magnetic regions 11' have their magnetization direction reversed easily, and therefore their reversed magnetization direction is corrected easily to be the original magnetization direction by the magnetic field from the recording element 21. In this operation, all magnetic regions 11' in the servo pattern area S are given the original uniform magnetization direction.

Next, the disk controller 6 waits for the re-magnetized servo pattern area S to complete its revolution, and reads the magnetic regions 11' in the servo pattern area S with the reproducing element 20 of the magnetic head 2 thereby obtaining an intact servo reproduction signal which consists of normal positive pulses, and then decodes this servo reproduction signal (S6). Decoding the servo reproduction signal provides a clock signal, address information and a burst signal which is to be used for fine tuning tracking operations.

Thereafter, based on the clock signals, address information, and burst signal for fine tuned tracking operations, the disk controller 6 controls the magnetic head 2, and thereby performs a recording/reproducing procedure to the data recording area D (S7). In the case of recording for example, magnetization is performed to magnetic regions 11 in the data recording area D at a timing appropriate to their spacing to record intended information in the form of magnetization directions. Also, in the case of reproducing, reading is performed to the magnetic regions 11 in the data recording area D at a timing appropriate to their spacing to read magnetization directions as a representation of the reproduced information.

If step S4 determines that the number of the reverse pulses is smaller than the predetermined number n (S4: NO), the disk controller 6 skips the re-magnetizing operation in the step S5 and performs the operation in the step S6. In this case, it is possible to obtain a normal servo reproduction signal without performing re-magnetization.

If the step S1 does not find a record reproduction command to the magnetic disk apparatus A (S1: NO), the magnetic head controller 62 waits until a record reproduction command is issued.

Therefore, according to the magnetic disk apparatus A offered by the present embodiment, it is possible, even if the magnetization direction in magnetic regions 11' of the servo-pattern area S is reversed, to make magnetically correct reading of the servo pattern area S and thereby to perform a recording/reproducing operation normally through a disk access control based on a correct servo reproduction signal obtained from the reading.

Figure 5:
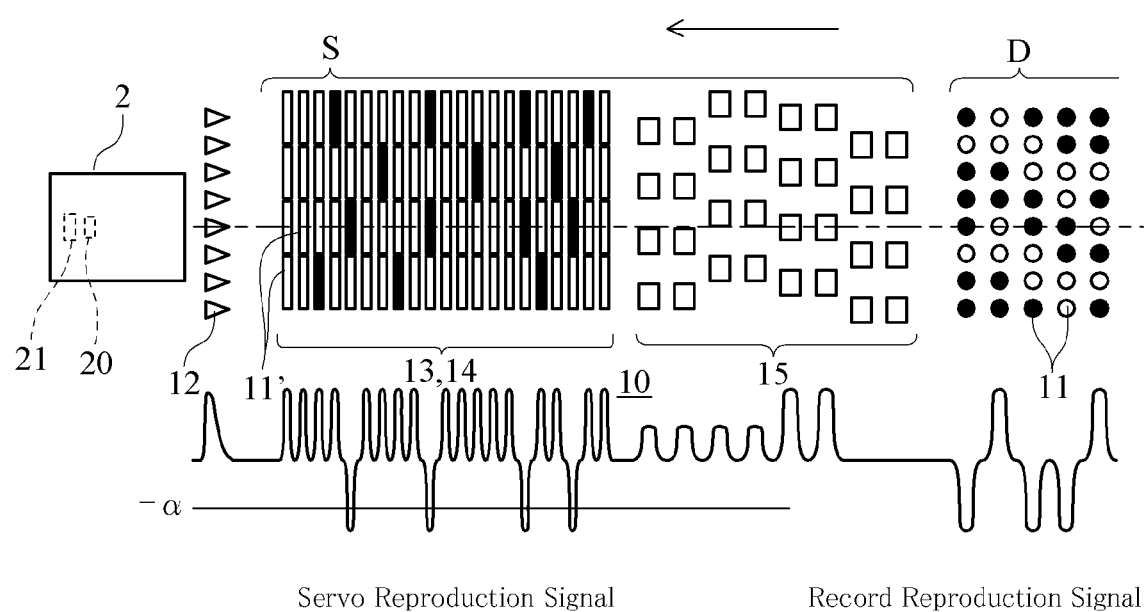
FIG. 5 is a diagram for illustrating a signal processing according to another embodiment.
Figure 6A:
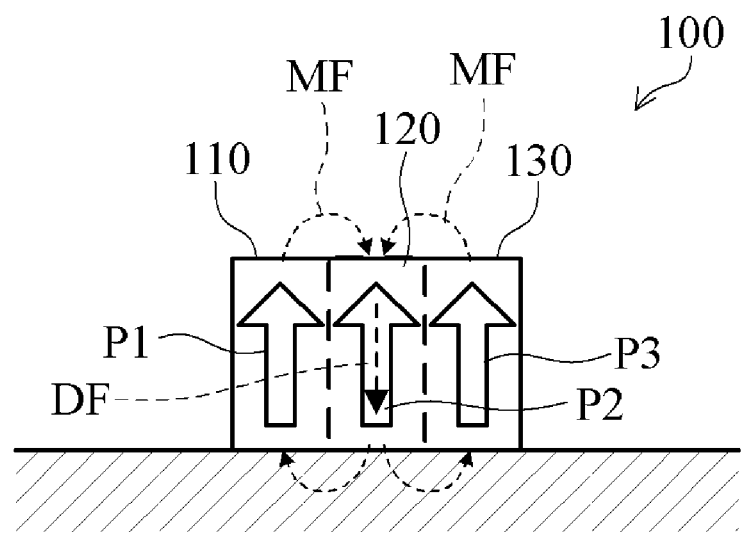
FIGS. 6A and 6B are diagrams for explaining a problem of a magnetic disk apparatus as related art.
Figure 6B:
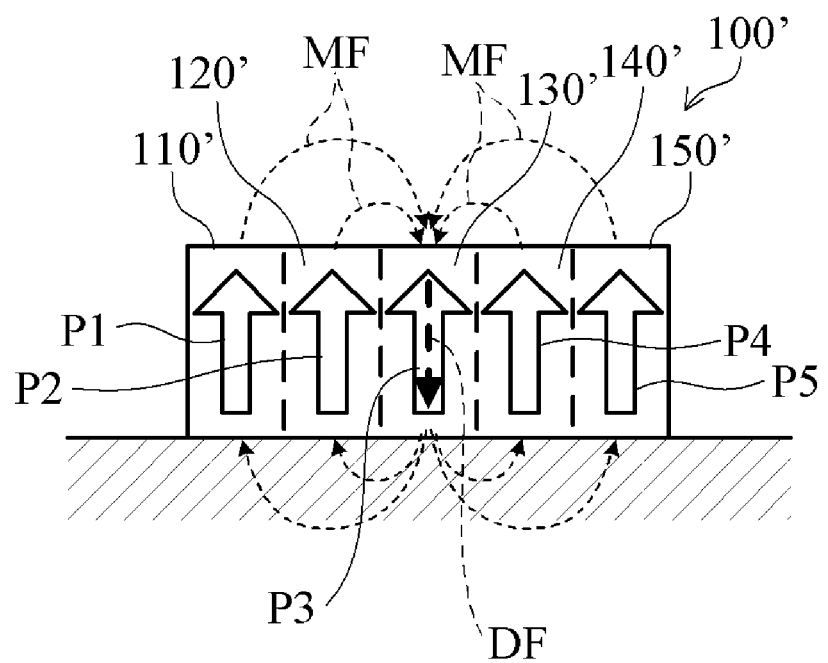

FIG. 5 illustrates a magnetic disk apparatus as another embodiment of the present invention. In this embodiment of the magnetic disk, the preamble section 13 and the address section 14 in the servo-pattern area S are provided by a plurality of magnetic regions 11' divided radially of the magnetic disk. Magnetic regions 11' of such a type as described above are also larger than magnetic regions 11 in the data recording area D and therefore, their magnetization direction tends to be reversed easily. Such a servo-pattern area S can also benefit from the procedure utilized in the previous embodiment, i.e., it is possible to obtain the same servo reproduction signal and to perform the re-magnetizing operation based on the servo reproduction signal. After the re-magnetizing operation, it is possible to make magnetically correct reading of the servo-pattern area S and therefore to perform recording/reproducing properly thorough a disk access control based on the servo reproduction signal.

It should be noted here that the present invention is not limited to the embodiments described above.

For example, in the re-magnetizing operation, the recording element may be operated only while it is passing near those magnetic regions whose magnetization direction is in the reversed state, so that the recording element will affect only these magnetic regions to correct their magnetization direction back to the original direction.

What is claimed is:

1. A magnetic disk apparatus comprising:
   a magnetic disk provided with a data recording area and a servo-pattern area, the data recording area being provided by a non-magnetic area scattered with magnetic regions, the servo-pattern area including a plurality of magnetic regions each having a larger area than the magnetic regions in the data recording area and pre-magnetized in a uniform magnetization direction;
   a magnetic head arranged to reciprocate radially of the magnetic disk for giving a magnetization direction to the magnetic regions in the data recording area and for reading a magnetization direction of the magnetic regions in the data recording area and of the magnetic regions in the servo-pattern area;
   a reverse-pulse detector for reading the servo-pattern area with the magnetic head before recording or reproducing with respect to the data recording area, the reverse-pulse detector being arranged to detect, from servo reproduction signal pulses obtained from magnetic directions in the magnetic regions of the servo-pattern area, a reverse pulse corresponding to reversal of magnetization direction relative to the uniform magnetization direction; and
   a re-magnetizer for causing the magnetic head to perform re-magnetizing of the magnetic regions in the servo-pattern area when a count of reverse pulses is not smaller than a threshold number.

2. The magnetic disk apparatus according to claim 1, wherein the servo-pattern area is provided with a magnetic reading start mark different in shape from the magnetic regions of the data recording area and the servo-pattern area, and the re-magnetizer causes the magnetic head to perform the re-magnetizing within a period of time starting upon reading of the reading start mark by the magnetic head and lasting until the magnetic head has passed through the servo-pattern area.

3. A magnetic disk access control method for a magnetic disk apparatus including a magnetic disk and a magnetic head, the magnetic disk including a data recording area and a servo-pattern area, the data recording area being provided by a non-magnetic area scattered with magnetic regions, the servo-pattern area including a plurality of magnetic regions each having a larger area than the magnetic regions in the data recording area and magnetized in a uniform magnetization direction, the magnetic head being arranged to reciprocate radially of the magnetic disk for giving a magnetization direction to the magnetic regions in the data recording area and for reading a magnetization direction of the magnetic regions in the data recording area and of the magnetic regions in the servo-pattern area, the method being implemented prior to recording or reading with respect to the data recording area, the method comprising:
   reading the servo-pattern area with the magnetic head for obtaining servo reproduction signal pulses corresponding to magnetic directions in the magnetic regions of the servo-pattern area;
   detecting, from the servo reproduction signal pulses, reverse pulses corresponding to a magnetization direction opposite to the uniform magnetization direction; and
   re-magnetizing the magnetic regions in the servo-pattern area with the magnetic head when a count of the reverse pulses is not smaller than a threshold number.

* * * * *